US012711490B2

(12) United States Patent
Cipriano

(10) Patent No.: US 12,711,490 B2
(45) Date of Patent: Aug. 18, 2026

(54) TOKENIZATION OF REAL-WORLD OBJECTS AND MONETIZATION THEREOF

(71) Applicant: Royal Ark, Inc., Fremont, CA (US)

(72) Inventor: Angelo Cipriano, Fremont, CA (US)

(73) Assignee: Royal Ark, Inc., Fremont, CA (US)

( * ) Notice: Subject to any disclaimer, the term of this patent is extended or adjusted under 35 U.S.C. 154(b) by 69 days.

(21) Appl. No.: 18/191,835

(22) Filed: Mar. 28, 2023

(65) Prior Publication Data

US 2023/0306413 A1 Sep. 28, 2023

Related U.S. Application Data

(60) Provisional application No. 63/362,125, filed on Mar. 29, 2022, provisional application No. 63/362,038, filed on Mar. 28, 2022.

(51) Int. Cl.
*G06Q 20/36* (2012.01)
*G06Q 20/12* (2012.01)
(Continued)

(52) U.S. Cl.
CPC ..... *G06Q 20/3672* (2013.01); *G06Q 20/3823* (2013.01); *G06Q 20/3827* (2013.01);
(Continued)

(58) Field of Classification Search
CPC ........... G06Q 20/3672; G06Q 20/3823; G06Q 20/3827; G06Q 20/389; G06Q 20/123;
(Continued)

(56) References Cited

U.S. PATENT DOCUMENTS 6,157,719 A * 12/2000 Wasilewski .......... H04N 7/1675 725/31
7,768,655 B2 * 8/2010 Hayashi ................ G01B 11/24 356/601
(Continued)

OTHER PUBLICATIONS

• Alahi et al., FREAK: Fast Retina Keypoint, 2012 IEEE Conference on Computer Vision and Pattern Recognition;2012; ; ; 10.1109/CVPR.2012.6247715, Jun. 16-21, 2012, pp. 510-517 (Year: 2012).*
(Continued)

*Primary Examiner* — James D Nigh
(74) *Attorney, Agent, or Firm* — Vani Moodley, Esq.

(57) ABSTRACT

The disclosure provides a system, a method, and a computer program product for tokenization of real-world physical objects and monetization thereof. The system is configured to scan a first physical object to generate a first geometric mesh. A 3D model of the physical object is generated based on the scan. The 3D model is used to determine dimensional data of the physical object. Further, one or more image capture sensors are used to capture additional details of the physical object. A first three dimensional (3D) digital object is created based on the generated 3D model, the dimensional data, and the additional details of the physical object. Further, a first cryptographic asset is obtained by encrypting the first 3D digital object. The first cryptographic asset is used for trading on a secure platform, such as blockchain.

16 Claims, 6 Drawing Sheets

(51) Int. Cl.

| | |
|---|---|
| ***G06Q 20/38*** | (2012.01) |
| ***G06Q 30/06*** | (2023.01) |
| ***G06Q 30/0601*** | (2023.01) |
| ***G06Q 40/04*** | (2012.01) |
| ***G06T 7/60*** | (2017.01) |
| ***G06T 17/20*** | (2006.01) |
| *G06T 7/586* | (2017.01) |

(52) U.S. Cl.
CPC ........... *G06Q 20/389* (2013.01); *G06Q 40/04* (2013.01); *G06T 7/60* (2013.01); *G06T 17/20* (2013.01); *G06T 7/586* (2017.01); *G06T 2200/24* (2013.01)

(58) Field of Classification Search
CPC ...... G06Q 20/367; G06Q 40/04; G06Q 30/06; G06Q 30/0601; G06Q 30/0631; G06T 7/60; G06T 17/20; G06T 2200/24; G06T 7/586
USPC ........................................................... 705/66
See application file for complete search history.

(56) References Cited

U.S. PATENT DOCUMENTS

| | | | | |
|---|---|---|---|---|
| 11,250,394 | B1 * | 2/2022 | Madisetti | G06Q 20/3825 |
| 11,296,876 | B1 * | 4/2022 | Bean | H04L 9/0656 |
| 2002/0162886 | A1 * | 11/2002 | Arsenault | G06K 7/10732 235/454 |
| 2010/0250201 | A1 * | 9/2010 | Sivovolenko | G01B 11/2433 703/2 |
| 2012/0328097 | A1 * | 12/2012 | Sheikh | H04L 9/0816 380/28 |
| 2016/0300234 | A1 * | 10/2016 | Moss-Pultz | H04L 9/3247 |
| 2018/0060646 | A1 * | 3/2018 | Harvey | G06V 10/225 |
| 2023/0070586 | A1 * | 3/2023 | Kapur | G06Q 20/123 |
| 2023/0177490 | A1 * | 6/2023 | Moore | G06Q 20/3823 705/66 |
| 2023/0230326 | A1 * | 7/2023 | Hill | G06T 17/00 345/419 |
| 2023/0306131 | A1 * | 9/2023 | Le Bouthillier | H04L 9/0643 |
| 2024/0095700 | A1 * | 3/2024 | McDonnell | A63F 13/69 |
| 2024/0152912 | A1 * | 5/2024 | Andral | G06Q 20/3829 |

OTHER PUBLICATIONS

• Rosten et al. “Faster and better: a machine learning approach to corner detection”, IEEE Trans. Pattern Analysis and Machine Intelligence (PAMI ’10), 32(1), pp. 105-119, 2010 (Year: 2010).*
• Sharma, et al., “Paperspeckle: microscopic fingerprinting of paper”, Proc. 18.sup.th ACM Conf. Comput. Comm. Secur., pp. 99-110, 2011 is incorporated by reference into Moss-Pultz and included in order to form a complete record. (Year: 2011).*
• Takahashi, et al. (FIBAR: Fingerprint Imaging by Binary Angular Reflection for Individual Identification of Metal Parts, Proc. of Fifth International Conference on Emerging Security Technologies (EST ’14), 2014, pp. 46-51) (Year: 2014).*
• Woodham (“Photometric method for determining surface orientation from multiple images”, Optical Engineering, 1980, pp. 139-144 (Year: 1980).*
• Rarible, “Your Ultimate Guide to Getting Started with NFTs on Rarible”, retrieved from https://web.archive.org/web/20220614140847/https://rarible.com/blog/ultimate-starting-guide/, Jun. 9, 2022, 17 pages (Year: 2022).*
• Genc et al., “What are the Top NFT Blockchains”, Mar. 8, 2023, 10 pages (Year: 2023).*
• Gutierrez et al. “A Close Look at Everledger—How Blockchain Secures Luxury Goods”, retrieved from https://www.altoros.com/blog/a-close-look-at-everledger-how-blockchain-secures-luxury-goods/, Apr. 27, 2017, 15 pages (Year: 2017).*
• Kimberley Process Mid-Term Report, United Arab Emirates, KP Chair 2016, Aug. 24, 2016, 24 pages (Year: 2016).*
Howell A Brief History of NFTs, Mar. 17, 2023, 9 pages) (Year: 2023).*
Sharma “What is a Non-Fungible Token?”, Feb. 26, 2022, 10 pages, retrieved from https://web.archive.org/web/20220325044344/https://www.investopedia.com/non-fungible-tokens-nft-5115211 (Year: 2022).*
Hamzat “The ultimate guide to understanding ERC Tokens”, Jul. 17, 2022, 20 pages (Year: 2022).*
• What is a Non-Fungible Token (NFT)?, retrieved from https://nonfungible.com/academy/nft/what-is-an-nft, retrieved on Aug. 10, 2022 5 pages, uploaded to internet archive on that date (Year: 2022).*
Qin et al. “Geometric Processing for Image-based 3D Object Modeling”, Jun. 26, 2021, 30 pages (Year: 2021).*
Kudela et al. “Integration of photogrammetry within laser scanning approach”, MIPRO 2020, Sep. 28-Oct. 2, 2020, pp. 1691-1694 (Year: 2020).*
Ortega et al. “Three different digitization techniques for works of art: RTI, photogrammetry and laser scan arm. Advantages and drawbacks in the practical case of a Romanesque lipsanoteca”, 1st ArCo—Art Collections 2020, Digital Heritage, pp. 125-138 ( Year: 2020).*

* cited by examiner

TOKENIZATION OF REAL-WORLD OBJECTS AND MONETIZATION THEREOF

TECHNOLOGICAL FIELD

This disclosure relates generally to creation and monetization of cryptographic assets and more particularly to a system and a method for creation and monetization of cryptographic assets.

BACKGROUND

Generally, artworks including sculptures and paintings are housed in private collections and museums around the world. Such artworks are not easily accessible by everyone due to a variety of factors such as location constraints, scheduled showings at museums/galleries, and, in the case of private collections, complete lack of access to the general public.

However, with the advancement in blockchain technologies, such artworks can be represented into digital artworks known as cryptographic assets. Such cryptographic assets are becoming hugely popular. The cryptographic assets may include fungible assets, such as cryptocurrency and non-fungible assets or non-fungible tokens (NFTs). The NFTs are units of data that are uniquely identifiable and may not be replicated. The NFTs are associated with several data formats, for example, images (such as digital art), videos and audio. The NFTs may be purchased, minted, or sold by a user.

BRIEF SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

The present disclosure provides a system, a method, and a computer programmable product for tokenization of real-world physical objects and monetization thereof. The system and the method provide techniques for scanning of the real-world physical object. The techniques disclosed in the present disclosure enables digitizing the real-world physical objects to create a digital representation of the real-world physical objects that can be stored on a blockchain based ledger. For example, the real-world physical objects may be scanned and digitized as a non-fungible tokens (NFTs). The techniques disclosed in the present disclosure include scanning of the real-world physical objects. For example, the real-world physical objects may be scanned using a digital scanner. Based on the scanning of the real-world physical objects, the system may create a three dimensional (3D) digital model of the real-world physical object. Further, the 3D digital model of the real-world physical object may be layered using software such as photogrammetry software. Furthermore, the tokenization of the real-world physical objects, such as NFTs involves use of blockchain based ledger, which may generate tokens based on the real-world physical objects that are secure, immutable as well as tamper-proof. Further, with the use of self-sovereign identification, the system allows a secure and transparent tracking as well as verification of ownership the tokenized real-world physical object. The techniques disclosed in the present disclosure further include trading the NFTs generated based on the real-world physical objects. The tokenized real-world physical objects can be bought, sold, and/or traded on a blockchain based marketplace.

The present disclosure provides several advantages over conventional methods of trading and monetizing the real-world physical objects. The use of photogrammetry may provide a realistic and an accurate representation of the real-world physical objects. Further, the use of blockchain based ledger technology ensures the security and transparency of the tokenized real-world physical objects. The self-sovereign identification system may provide a secure and transparent way to verify ownership of the real-world physical objects. The blockchain based platform provides a transparent and secure way for investors to participate in the real-world physical object market. The disclosure also provides a recommendation system that recommends user about various other tokenized real-world physical objects based on a recent purchase or a search history of the user on the marketplace.

In this manner, the techniques disclosed in the present disclosure enable tokenization of real-world physical objects and monetization thereof.

A system, a method, a computer programmable product are provided for tokenization of real-world physical objects and monetization thereof.

In one aspect, a system for tokenization of real-world physical objects and monetization thereof is disclosed. The system comprises a processor. The processor is configured to control one or more scanning devices to scan a first physical object. The processor is further configured to generate a first geometric mesh of a first physical object based on the scanning of the first physical object. The processor is further configured to generate a first 3D model of the first physical object based on the generated first geometric mesh. The processor is further configured to determine dimensional data associated with one or more dimensions of the first physical object based on the generated first 3D model. The processor is further configured to control one or more image capture sensors to capture additional details data for the first physical object. The processor is further configured to generate a first three dimensional (3D) digital object based on the on the generated first 3D model, the dimensional data, and the additional details data. The processor is further configured to encrypt the generated first 3D digital object using a plurality of encryption techniques to generate a first cryptographic asset associated with the first physical object. The processor is further configured to output the generated first cryptographic asset.

In additional system embodiments, the processor is further configured to receive a first user input associated with a selection of a first blockchain network from a set of blockchain networks. The processor is further configured to generate a first smart contract to be associated with the generated first cryptographic asset based on the received first user input. The processor is further configured to implement a set of hashing techniques on the generated first cryptographic asset. The processor is further configured to encrypt the generated first cryptographic asset using a set of encryption techniques. The processor is further configured to generate the first cryptographic asset associated with the first physical object based on the implementation of the set of hashing techniques and the encryption of the first 3D digital object. The processor is further configured to render the generated first cryptographic asset on the marketplace for trading.

In additional system embodiments, the set of encryption techniques includes an advanced encryption standard technique, a Ron Rivest, Adi Shamir and Leonard Adleman (RSA) technique, and a Homomorphic encryption.

In additional system embodiments, the set of hashing techniques includes a secure hashing algorithm, a BLAKE hashing technique, a skien hashing technique, and a whirlpool hashing technique.

In additional system embodiments, the processor is further configured to render the generated first cryptographic asset on a user interface (UI) of one or more user devices associated with one or more users. The processor is further configured to receive a first user input from a first user device of the one or more user devices. The first user input corresponds to a request to access the first 3D digital object. The processor is further configured to decrypt the encrypted cryptographic asset to the first 3D digital object based on the reception of the first user input. The processor is further configured to allow a first user associated with the first user device to access the first 3D digital object based on the decryption.

In additional system embodiments, the processor is further configured to receive a first set of reviews associated with the first 3D digital object from the one or more user devices. The processor is further configured to receive a first set of comments associated with the first 3D digital object from the one or more user devices. The processor is further configured to render at least one of the received first set of reviews or the received first set of comments on the user interface of the one or more user devices In additional system embodiments, the processor is further configured to recommend a set of 3D digital objects associated with a set of physical objects to the first user. Each of the recommended set of 3D digital objects are related to the first 3D digital object.

In additional system embodiments, the generated first cryptographic asset is a non-fungible token (NFT).

In additional system embodiments, the additional details data for the first physical object includes texture information associated with the first physical object.

In additional system embodiments, the one or more scanning devices uses one or more scanning techniques to scan the first physical object.

In additional system embodiments, the generated first geometric mesh includes a set of points that defines a geometry of the first physical object.

In another aspect, a method for tokenization of real-world physical objects and monetization thereof is disclosed. The method comprises controlling one or more scanning devices to scan a first physical object. The method comprises generating a first geometric mesh of a first physical object based on the scanning of the first physical object. The method comprises generating a first three-dimensional (3D) model of the first physical object based on the generated first geometric mesh. The method comprises determining dimensional data associated with one or more dimensions of the first physical object based on the generated first 3D model. The method further comprises controlling one or more image capture sensors to capture additional details data of the first physical object. The method further comprises generating a first three dimensional (3D) digital object based on the generated first 3D model, the dimensional data, and the additional details data. The method further comprises encrypting the generated first 3D digital object using a set of encryption techniques to generate a first cryptographic asset associated with the first physical object. The method further comprises output the generated first cryptographic asset.

In additional method embodiments, the method further comprises rendering the generated first cryptographic asset on a user interface (UI) of one or more user devices associated with one or more users. The method further comprises receiving a first user input from a first user device of the one or more user devices. The first user input corresponds to a request to access the first 3D digital object. The method further comprises decrypting the encrypted cryptographic asset to the first 3D digital object based on the reception of the first user input. The method further comprises allowing a first user associated with the first user device to access the first 3D digital object based on the decryption.

In additional method embodiments, the method further comprises receiving a first set of reviews associated with the first 3D digital object from the one or more user devices. The method further comprises receiving a first set of comments associated with the first 3D digital object from the one or more user devices. The method further comprises rendering at least one of the received first set of reviews or the received first set of comments on the user interface of the one or more user devices.

In additional method embodiments, the method further comprises recommending a set of 3D digital objects associated with a set of physical objects to the first user, wherein the recommended set of 3D digital objects are related to the first 3D digital object.

In additional method embodiments, the generated first cryptographic asset is a non-fungible token (NFT).

In additional method embodiments, the additional details data for the physical object includes texture information associated with the first physical object.

In additional method embodiments, the one or more scanning devices uses one or more scanning techniques to scan the first physical object.

In yet another aspect, a computer program product comprising a non-transitory computer readable medium having stored thereon computer executable instructions which when executed by at least one processor, cause the processor to carry out operations for tokenization of real-world physical objects and monetization thereof. The operation comprises controlling one or more scanning devices to scan a first physical object. The operation comprises generating a first geometric mesh of a first physical object based on the scanning of the first physical object. The operation comprises generating a first three-dimensional (3D) model of the first physical object based on the generated first geometric mesh. The operation comprises determining dimensional data associated with one or more dimensions of the first physical object based on the generated first 3D model. The operation further comprises controlling one or more image capture sensors to capture additional details data of the first physical object. The operation further comprises generating a first three dimensional (3D) digital object based on the generated first 3D model, the dimensional data, and the additional details data. The operation further comprises encrypting the generated first 3D digital object using a set of encryption techniques to generate a first cryptographic asset associated with the first physical object. The operation further comprises outputting the generated first cryptographic asset.

The foregoing summary is illustrative only and is not intended to be in any way limiting. In addition to the illustrative aspects, embodiments, and features described above, further aspects, embodiments, and features will become apparent by reference to the drawings and the following detailed description.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
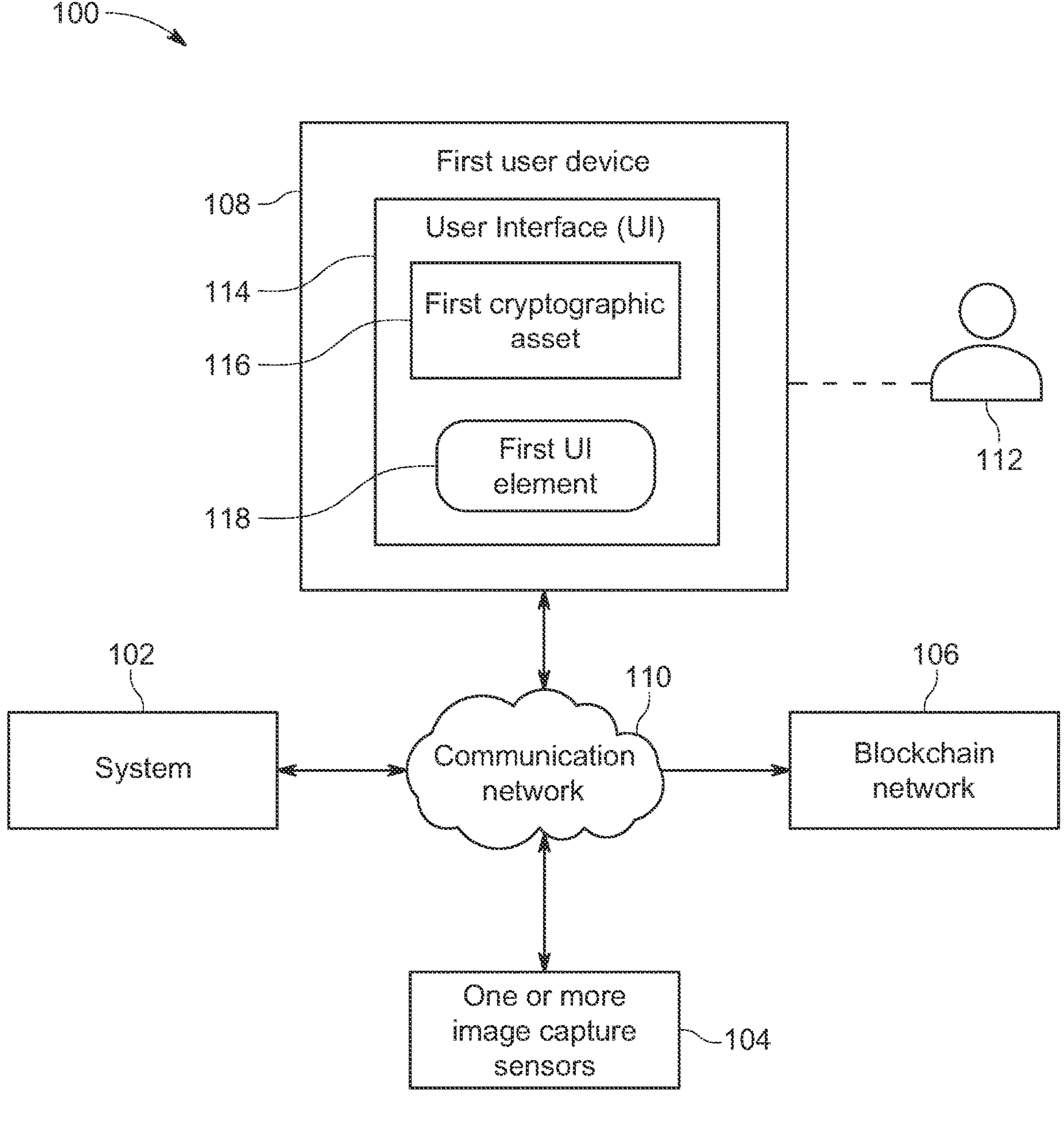
Figure 2:
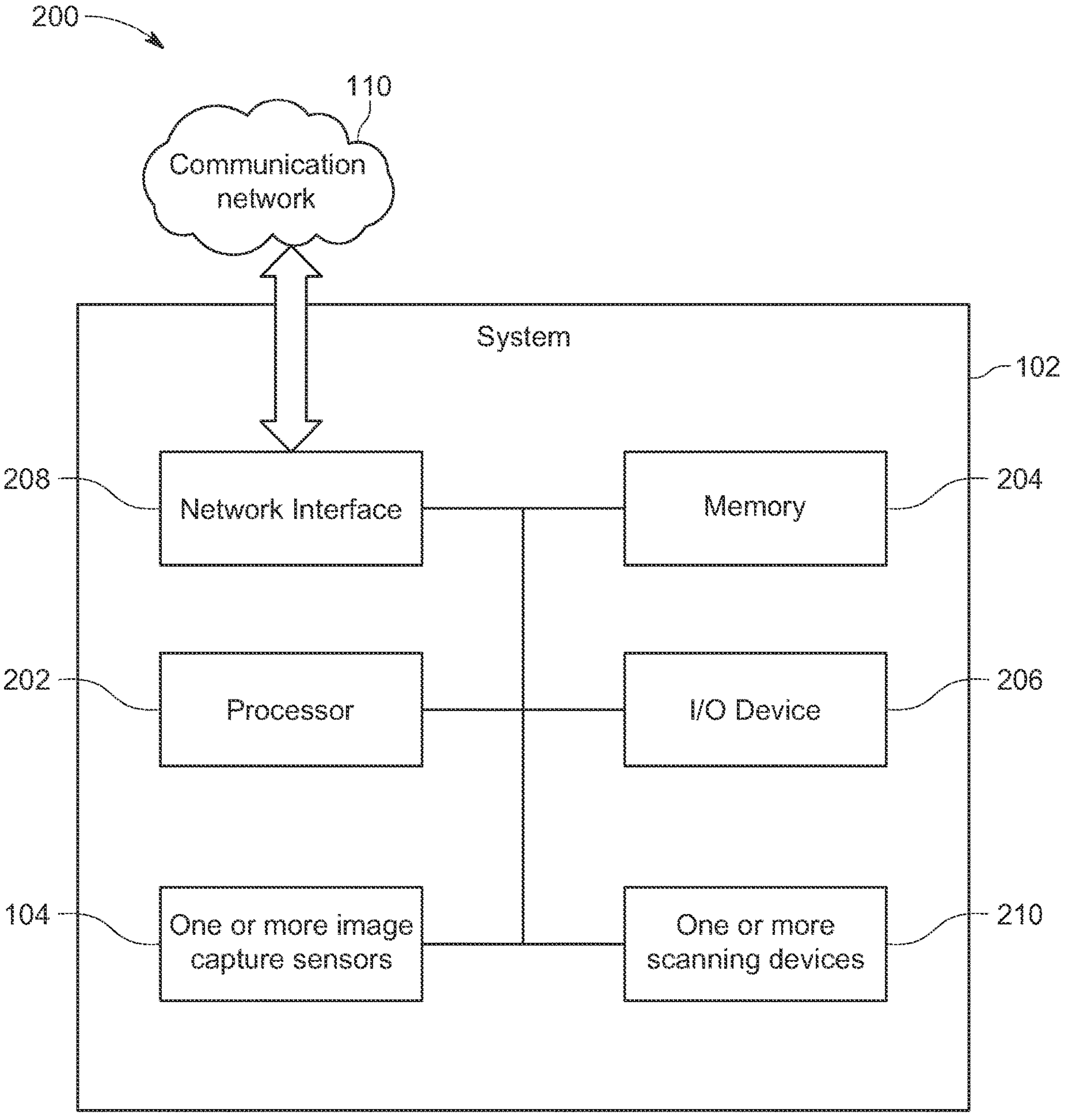
Figure 3:
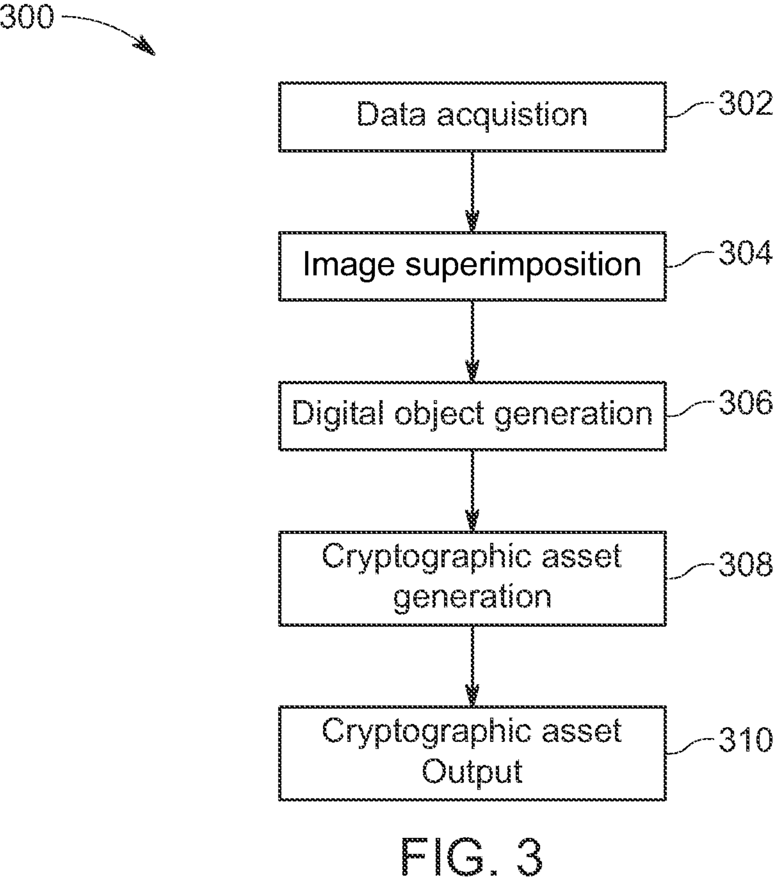
Figure 4:
Figure 4:
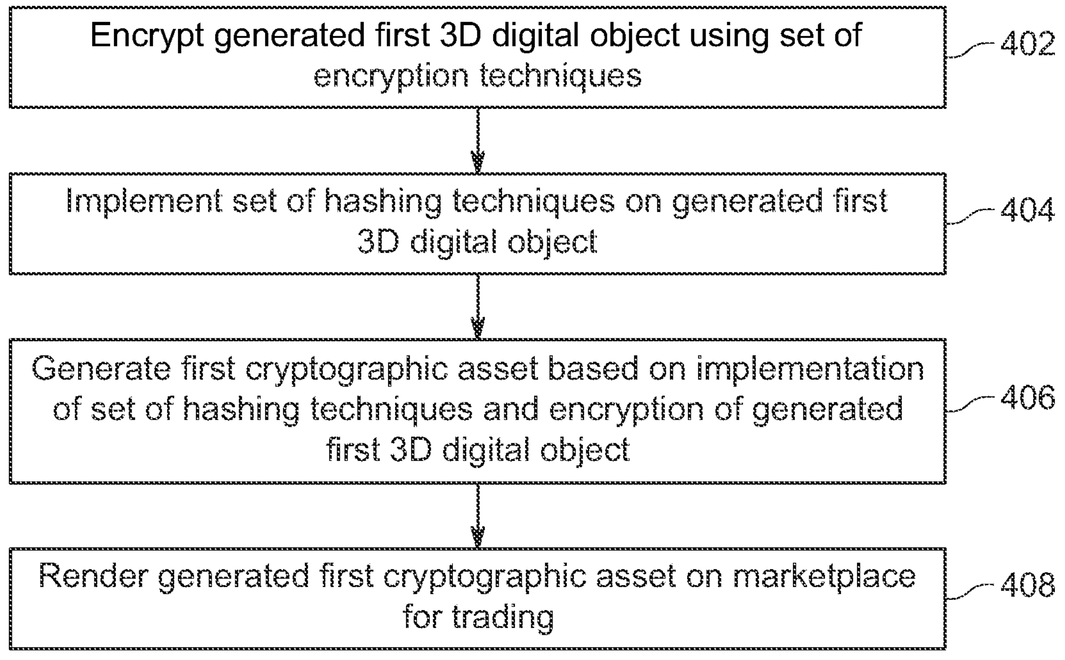
Figure 5:
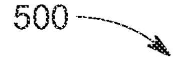
Figure 5:
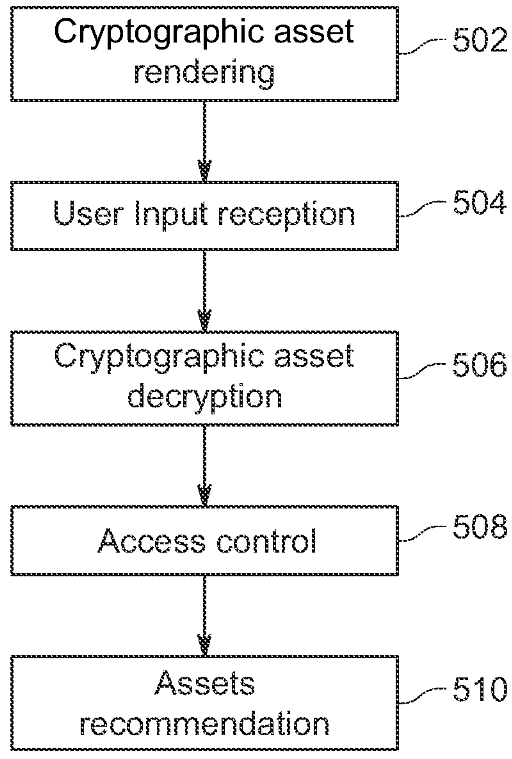
Figure 6:
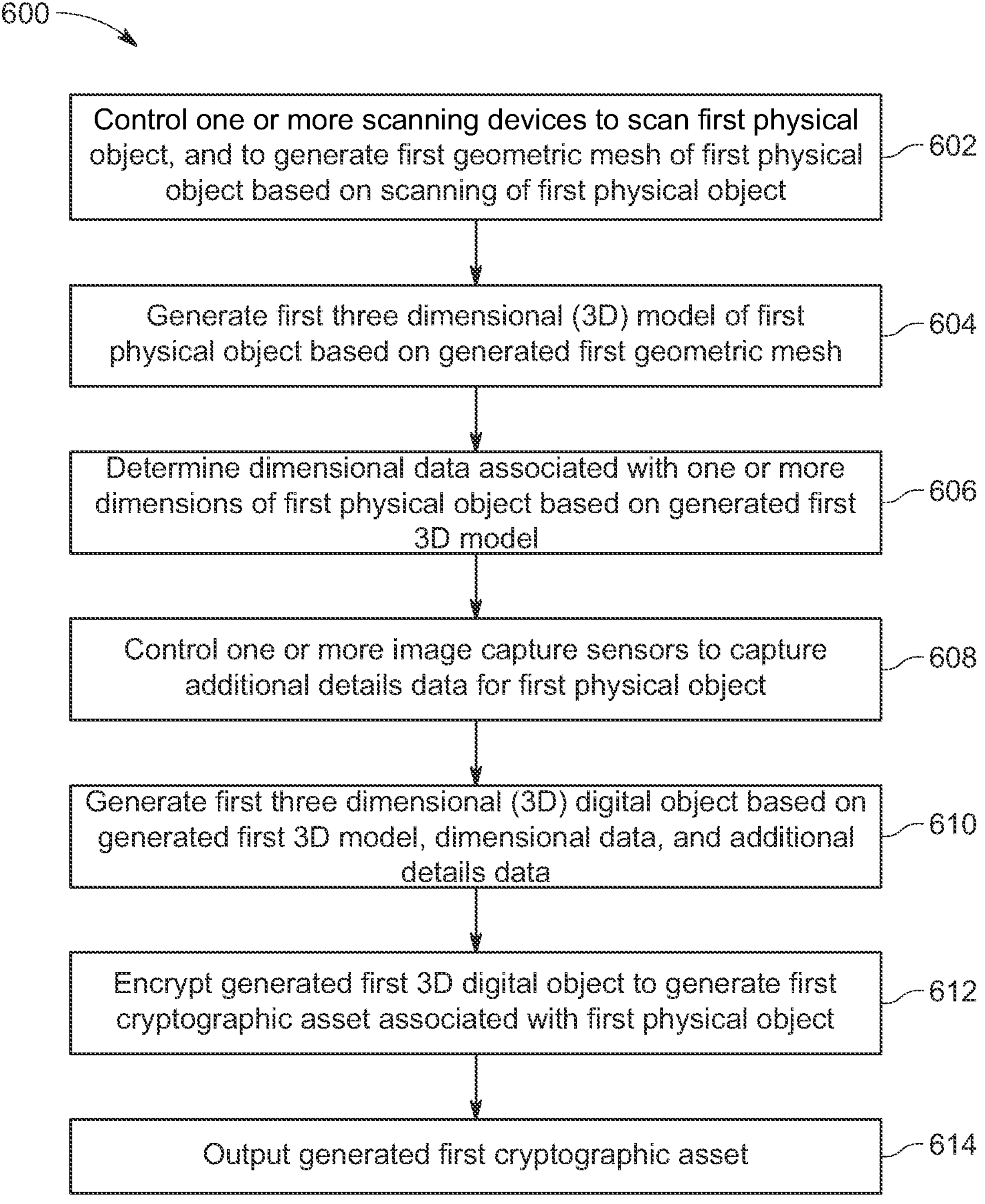

Having thus described example embodiments of the invention in general terms, reference will now be made to the accompanying drawings, which are not necessarily drawn to scale, and wherein:

FIG. 1 is a block diagram that illustrates an exemplary environment for tokenization of real-world physical objects and monetization thereof, in accordance with an example embodiment;

FIG. 2 is an exemplary block diagram of the system of FIG. 1, in accordance with an example embodiment;

FIG. 3 is a diagram that illustrates exemplary operations for tokenization of real-world physical objects and monetization thereof, in accordance with an example embodiment;

FIG. 4 is a flowchart that illustrates an exemplary method for tokenizing the first physical object, in accordance with an example embodiment;

FIG. 5 is a diagram that illustrates exemplary operations for monetization of the first cryptographic asset on a marketplace, in accordance with an example embodiment; and FIG. 6 is a flowchart that illustrates an exemplary method tokenization of real-world physical objects and monetization thereof, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems, apparatuses, and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Embodiments of the present disclosure may provide a system, a method, and a computer program product for tokenization of real-world physical objects and monetization thereof.

FIG. 1 is a block diagram that illustrates an exemplary environment for tokenization of real-world physical objects and monetization thereof, in accordance with an embodiment of the disclosure. With reference to FIG. 1, there is shown a network environment 100, which may include a system 102, one or more image capture sensors 104, a blockchain network 106, a first user device 108 of one or more user devices, and a communication network 110. The first user device 108 may be associated with a first user 112 of the one or more users. The first user device 108 may further include a user interface (UI) 114. The UI 114 may display a first cryptographic asset 116 and a first UI element 118.

The system 102 may include suitable logic, circuitry, interfaces, and/or code that may be configured to tokenize the real-world physical objects and further monetize them. The system 102 may be configured to generate a first geometric mesh of a first physical object. The system 102 may be further configured to control the one or more image capture sensors 104 to capture additional details data for the first physical object. The system 102 may be further configured to generate a first three dimensional (3D) digital object based on the generated first 3D model, the dimensional data, and the additional details data and further encrypt the generated first 3D digital object using a set of encryption techniques to generate a first cryptographic asset 116 associated with the first physical object. The system 102 may be further configured to output the generated first cryptographic asset 116. Examples of the system 102 may include, but are not limited to a desktop, a laptop, a notebook, a netbook, a tablet, a smartphone, a mobile phone, an application server, a web server, or the like.

Each of the one or more image capture sensors 104 may include suitable logic, circuitry, interfaces, and/or code that may be configured to capture additional details data for the first physical object. In an embodiment, the additional details data may correspond to a first image of the first physical object. Each of the one or more image capture sensors 104 may be further configured to transmit the captured first image of the first physical object to the system 102. Examples of each of the one or more image capture sensors 104 may include, but are not limited to, a depth sensor, a wide-angle camera, an action camera, a closed-circuit television (CCTV) camera, a camcorder, a digital camera, camera phones, a time-of-flight camera (ToF camera), a night-vision camera, and/or other image capture devices.

The blockchain network 106 may be a distributed database that may include a plurality of nodes. Each node of the plurality of nodes may be associated with an entity such as an individual user or an enterprise. The blockchain network 106 may be utilized to securely store and/or trade a set of cryptographic assets that may include the first cryptographic asset 116. Examples of the blockchain network 106 may include, but are not limited to, Ethereum® blockchain, Flow® blockchain, Binance® smart chain blockchain, Cardano® blockchain, Tezos® blockchain, Tron® blockchain, Algorand® blockchain, Hyperledger® blockchain and Ripple® blockchain.

The first user device 108 may be a computing device (such as a client device) associated with the first user 112 capable of rendering the UI 114. The first user device 108 may be further capable of receiving one or more user inputs via the UI 114 from the first user 112. Examples of the first user device 108 may include, but are not related to, a desktop, the laptop, the notebook, the netbook, the tablet, the smartphone, the mobile phone, the application server, the web server, an internet-of-things (IoT) device, an augmented reality (AR) device, a virtual reality (VR) device, a mixed reality device, a gaming device, an infotainment device, or the like.

The UI 114 may correspond to a platform associated with the set of cryptographic assets. The platform may be, for example, a digital marketplace or an electronic commerce platform for the performance of the set of transactions of the set of cryptographic assets. For example, the platform may be utilized for purchase of the first cryptographic asset 116. In some embodiments, the system 102 may be a part of the platform associated with the set of cryptographic assets.

The first cryptographic asset 116 may be displayed on the UI 114. The first cryptographic asset 116 may be for example, non-fungible tokens (NFTs). The first cryptographic asset 116 may be a first NFT displayed on the UI 114 for the cryptographic asset transaction such as purchase, trade, or access control. The first UI element 118 may be utilized for providing a user input corresponding to the transaction of the first cryptographic asset 116. For example, the first UI element 118 may be utilized to receive the first input for purchase of the first cryptographic asset 116. The first input may be the single action, such as a touch input provided by the first user 112.

The system 102, the one or more image capture sensors 104, the blockchain network 106, and the first user device 108 may be communicatively coupled with each other via the communication network 110. The communication network 110 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

In operation, the first user 112 may wish to generate the cryptographic asset such as the NFT of the first physical object. In an embodiment, the first physical object may be an animated or an in-animated object. To generate the first cryptographic asset 116, the first user 112 may use the system 102. The system 102 may be configured to control one or more scanning devices to scan a first physical object. The system 102 may further generate a first geometric mesh of the first physical object based on the scanning of the first physical object. The system 102 may further generate a first three dimensional (3D) model of the first physical object based on the generated first geometric mesh. The system 102 may further determine dimensional data associated with one or more dimensions of the first physical object based on the generated first 3D model. Details about the one or more scanning devices and the first geometric mesh are provided, for example, in FIGS. 2 and 3.

The system 102 may be further configured to control the one or more image capture sensors 104 to capture additional details data for the first physical object. In an embodiment, the additional details data may correspond to the first image of the first physical object that may include texture information associated with the first physical object. In an embodiment, at least one image sensor of the one or more image capture sensors 104 may be configured to capture the first image of the first physical object. The capture first image may include texture information associated with the first physical object.

Based on the generated first 3D model, the dimensional data, and the additional details data, the system 102 may be further configured to generate a first three dimensional (3D) digital object. The generated 3D digital object may be a named record that may be composed of structured sequences of bits or bytes and further include the metadata about the properties of the first physical object. The generated 3D digital object may be intangible whereas the first physical object may be tangible. In other words, the generated 3D digital object may be a digital representation (or replica) of the first physical object.

The system 102 may be further configured to encrypt the generated first 3D digital object to generate the first cryptographic asset 116 associated with the first physical object. As discussed above, the first cryptographic asset 116 associated with the first physical object may correspond to a non-fungible asset (NFT). The NFT may be a unit of data that may be uniquely identifiable and may not be replicated. The NFT may be associated with several data formats, for example, images (such as digital art), videos and audio. The system 102 may be configured to encrypt the generated first 3D digital object using a public key. Details about the first cryptographic asset 116 are provided, for example, in FIG. 3.

The system 102 may be further configured to output the generated first cryptographic asset 116. In an embodiment, the system 102 may be configured to display the first cryptographic asset 116 on the UI 114 of the first user device 108. In an embodiment, the first UI element 118 may be further displayed on the UI 114. Based on the selection of the first UI element 118, the system 102 may receive a request to access the first cryptographic asset 116 from the first user device 108. In an embodiment, the first user 112 may be required to pay a pre-determined amount before requesting the access to the first cryptographic asset 116. Details about accessing the first cryptographic asset 116 are provided, for example, in FIG. 5.

It may be noted that as per FIG. 1, the system 102 and the one or more image capture sensors 104 are shown as two separate entities. However, the present disclosure may not be limited to such implementation. In some embodiments, the one or more image capture sensors 104 may be integrated within the system 102.

FIG. 2 is an exemplary block diagram of the system of FIG. 1, in accordance with an embodiment of the disclosure. FIG. 2 is explained in conjunction with elements from FIG. 1. With reference to FIG. 2, there is shown a block diagram 200 of the system 102. The system 102 may include processor 202, a memory 204, an input/output (I/O) device 206, and a network interface 208. With reference to FIG. 2, there is further shown one or more scanning devices 210, and the one or more image capture devices 104. The processor 202 may be communicatively coupled to the memory 204, the I/O device 206, the network interface 208, the one or more scanning devices 210, and the one or more image capture devices 104.

The processor 202 may comprise suitable logic, circuitry, and interfaces that may be configured to execute instructions stored in the memory 204. The executed instructions may correspond to a set of operations for generation of the first geometric mesh, generation of the 3D model, controlling the one or more image capture sensors 104, generation of the first 3D digital object, encrypting the generated first 3D digital object, and outputting the generated first cryptographic asset 116. The processor 202 may be implemented based on a number of processor technologies known in the art. Examples of the processor 202 may include, but are not limited to, a Graphical Processing Unit (GPU), a co-processor, a Central Processing Unit (CPU), ×86-based processor, a Reduced Instruction Set Computing (RISC) processor, an Application-Specific Integrated Circuit (ASIC) processor, a Complex Instruction Set Computing (CISC) processor, and a combination thereof.

The memory 204 may include suitable logic, circuitry, and/or interfaces that may be configured to store the program instructions executable by the processor 202. Additionally, the memory 204 may store the first geometric mesh, the first 3D model, the additional details data, the first 3D digital object, and the first cryptographic asset 116. In at least one embodiment, the memory 204 may store a first set of reviews and a first set of comments. In another embodiment, the memory 204 may further store a set of 3D digital objects associated with a set of physical objects. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, and/or interfaces that may be configured to act as an I/O channel/interface between the user and the system 102. The I/O device 206 may be configured to receive one or more user inputs. In some embodiments, the system 102 may receive user input, via the I/O device 206 to access the first cryptographic asset 116. The I/O device 206 may comprise various input and output devices, which may be configured to communicate with different operational components of the system 102. Examples of the I/O device 206 may include, but are not limited to, a touch screen, a keyboard, a mouse, a joystick, a microphone, and a display.

The network interface 208 may comprise suitable logic, circuitry, interfaces, and/or code that may be configured to establish communication between the system 102, the one or more image capture devices 104, the user device 108, and the one or more scanning devise 210, via the communication network 110. The network interface 208 may be configured to implement known technologies to support wired or wireless communication. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

Each of the one or more scanning devices 210 may comprise suitable logic, circuitry, and interfaces that may be configured to scan an object, such as the first physical object. Each of the one or more scanning devices 210 may be configured to capture depth information of the object, from one or more viewing angles. The scanning device 104 may be further configured to transmit the captured depth information to the system 102, via the communication network 110. The sensing device 106 may comprise a plurality of sensors, such as a combination of a depth sensor, a color sensor, (such as a red-green-blue (RGB) sensor), and/or an infrared (IR) sensor which may capture the first physical object from the single viewpoint. Examples of the sensing device 106 may include, but are not limited to, the depth sensor, the RGB sensor, the IR sensor, a 3D-mesh structure generator used to move an object, an image sensor, or a motion-detector device. In an embodiment, the one or more image capture sensors 104 may be integrated within the one or more scanning devices 210.

The functions or operations executed by the system 102, as described in FIG. 1, may be performed by the processor 202. Operations executed by the processor 202 are described in detail, for example, in FIGS. 3, 4, 5, and 6.

FIG. 3 is a diagram that illustrates exemplary operations for tokenization of real-world physical objects and monetization thereof, in accordance with an embodiment of the disclosure. FIG. 3 is explained in conjunction with elements from FIG. 1 and FIG. 2. With reference to FIG. 3, there is shown a block diagram 300 that illustrates exemplary operations from 302 to 310, as described herein. The exemplary operations illustrated in the block diagram 300 may start at 302 and may be performed by any computing system, apparatus, or device, such as by the system 102 of FIG. 1 or processor 202 of FIG. 2. Although illustrated with discrete blocks, the exemplary operations associated with one or more blocks of the block diagram 300 may be divided into additional blocks, combined into fewer blocks, or eliminated, depending on the particular implementation.

At 302, a data acquisition operation may be performed. In the data acquisition operation, the processor 202 may be configured to acquire data required to tokenize the first physical object. As discussed above the first physical object may be an animated object (such as a human, an animal, and the like) or an in-animated object (such as a painting, or an artwork). In an embodiment, the processor 202 may be configured to control the one or more scanning devices 210 to scan the first physical object. Each of the one or more scanning devices 210 may capture a surface of the first physical object in the form of a point cloud, which may be a collection of millions of individual points that may represent the surface of the first physical object.

Based on the scanning of the first physical object, the processor 202 may be configured to generate a first geometric mesh of the first physical object. The first geometric mesh may indicate a three dimensional (3D) structure of the first physical object and may include information associated with a depth, a distance, and an edge of the first physical object. The first geometric mesh may include point cloud data associated with the geometry and texture of the first physical object.

In an embodiment, each of the one or more scanning devices 210 may use one or more scanning techniques to scan the first physical object. In an embodiment, the one or more scanning techniques may include a laser triangulation scanning technique. In the laser triangulation scanning technique, one or more laser-based three dimensional (3D) scanners may use trigonometric triangulation to accurately capture the 3D shape of the first physical object as millions of points. The one or more laser-based 3D scanners may work by projecting a laser line or multiple lines onto the first physical object and further capture their reflection with a single sensor or multiple sensors.

In another embodiment, the one or more scanning techniques may include a structured light scanning technique. In the structured light scanning technique, a known pattern of grids or horizontal bars may be projected on to the first physical object. Further, the projection may deform upon a striking surface of the first physical object that may allow vision systems to calculate the depth and surface information of the first physical object. In an embodiment, the one or more scanning devices 210 may include a full color structured light scanner. Examples of the full color structured light scanner may include, but are not limited to, an Artec® scanner.

After scanning, the point cloud data may be further processed to create a 3D model of the first physical object. In an embodiment, the processor 202 may be configured to use one or more specialized softwares that may convert the point cloud data into XYZ axis data points, creating a mesh of polygons that may describe the geometry of the first physical object. The one or more specialized software's may be referred to as "3D Modelling" softwares. In one embodiment, the created 3D model may be in an OBJ format. The OBJ files may be polygonal meshes that may be accompanied by an image file like a jpg or png, and a material (mtl) file that may dictate how to wrap the image file onto the first geometric mesh. In another embodiment, the created 3D model may be in an STL format.

In an embodiment, a full shape is all of the polygons that make up the full volume of the first physical object. The number of polygons in the mesh may determine a level of detail in the created 3D model. Simple shapes, for example a cube, can be described with fewer polygons which may save computation time. Complex shapes, for example a feather, may require many more polygons, requiring significant computation time to capture the fine details. Animated shapes similarly require more polygons and more computation time. The polygon count in the 3D model may be used to determine the exact dimensions of the first physical object. The higher the polygon count, the more accurate the dimensions will be. The polygon count can also be used to determine the level of detail that can be captured in the model.

The system 102 may capture dozens or hundreds of individual pictures with the one or more image capture sensors 104. Further, the system 102 may use one or more softwares to map the pictures onto a scan and replace the color photographic data of the one or more scanning devices 210 with superior data from the secondary photographic process. Subsequently, a full color 3D file may be exported in a variety of color formats.

In an embodiment, the system 102 may use a secondary photographic process that may be a type of photogrammetry and may be also used to add additional detail to the first geometric mesh (or a 3D model). In general, photogrammetry is the process of creating 3D models from photographs. Multiple photographs of the object are taken from different angles, and specialized software is used to create a 3D model of the object from the photographs. This can provide additional detail to the model, down to the micron level.

In another embodiment, the system 102 may be configured to control the one or more image sensors 104 that may not be integrated within the one or more scanning devices 210 to capture the additional details data for the first physical object. In an embodiment, the additional details data may correspond to a first image of the first physical object. The first image of the first physical object may include texture information associated with the first physical object. The system 102 may further store the capture first image in the memory 204.

It may be noted object surfaces may be handled differently and may be best recreated with material textures (also known as PBR textures: Physically Based Rendering). In an embodiment, the system 102 may include one or more handheld scanners that may be able to record high levels of surface detail and incorporate the recorded high-level details into the 3D model (i.e., the obj file). However, the same process may not be ideal for a two-dimensional (2D) object such as paintings and stamps. In such cases, one or more surface scanners may be used to capture surface colour more accurately, glossiness, metalness, transparancy, etc.

In an embodiment, assets may be created by manually drawing them, importing CAD data which describes the asset or via object scanners such as handheld lasers, lidar and/or photogrammetry systems. In an embodiment, the system 102 may be further configured to determine dimensional data associated with one or more dimensions of the first physical object based on the generated first 3D model.

At 304, an image superimposition operation may be performed. In the image superimposition operation, the system 102 may be configured to superimpose the captured additional details data on the generated first geometric mesh (or the first 3D model). Specifically, the system 102 may be configured to superimpose the first image of the first physical object on the generated first geometric mesh of the first physical object. In an embodiment, the system 102 may be configured to map the captured first image on the generated mesh of the first physical object.

In an embodiment, the system 102 may be configured to create a UV map from the .obj file to wrap the shape with the PBR textures without any overlap or missing gaps, much like a fabric pattern when building clothing. As an example, and with reference to baseball game, the ball may be the OBJ file. The surface scanner captures the details of the leather and the thread, creating a UV map. The UV map may look like the two oblong shapes that, when sewn together, cover the sphere.

At 306, a digital object generation may be performed. In the digital object generation operation, the system 102 may be configured to generate a first three dimensional (3D) digital object. In an embodiment, the generated first 3D digital object may be referred as an enhanced 3D model. The generated first 3D digital object may be associated with the first physical object. In an embodiment, the generated first 3D digital object may be a digital representation or a digital replica of the first physical object. The first 3D digital object may be generated based on the generated first 3D model, the dimensional data, and the additional details data.

At 308, a cryptographic asset generation operation may be performed. In the cryptographic asset generation, the system 102 may be configured to generate the cryptographic asset associated with the first physical object. In an embodiment, the system 102 may be configured to implement advanced cryptographic algorithms on the generated first 3D digital object to generate the first cryptographic asset 116. As discussed above, the generated cryptographic asset may be NFT. In an embodiment, the system 102 may be configured to fractionalize the generated first cryptographic asset 116 into a set of fractional cryptographic assets. Each set of fractional cryptographic assets may be traded on a marketplace like the first cryptographic asset. Details about trading of the first cryptographic asset are provided, for example, in FIG. 5.

At 310, a cryptographic asset output operation may be performed. In the cryptographic asset output operation, the system 102 may be configured to output the generated first cryptographic asset 116. In an embodiment, the output of the generated first cryptographic asset 116 may correspond to rendering of the generated first cryptographic asset 116 on a display screen of the user device 108. In another embodiment, the output of the generated first cryptographic asset 116 may correspond to storing of the generated first cryptographic asset 116 in the memory 204 or on the blockchain network 106. In another embodiment, the output of the generated first cryptographic asset 116 may correspond to uploading of the generated first cryptographic asset 116 on a marketplace for sale of the first cryptographic asset 116. Details about the sale of the first cryptographic asset 116 are provided, for example, in FIG. 5.

FIG. 4 is a flowchart that illustrates an exemplary method 400 for tokenizing the first physical object, in accordance with an embodiment of the disclosure. It will be understood that each block of the flow diagram of the method 400 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 204 of the system 102, employing an embodiment of the present invention and executed by the processor 202. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

At 402, the generated first 3D digital object may be encrypted. In an embodiment, the system 102 may be further configured to encrypt the generated first 3D digital object using a set of encryption techniques to generate an encrypted 3D model that may be stored in a decentralized storage. In an embodiment, the system 102 may be configured to use advanced encryption standard (AES) for symmetric-key encryption of sensitive information related to the first 3D digital object. This can be useful for encrypting the private keys of the token holders, as well as for securing communication channels between different parties that may be involved in a tokenization process. The tokenization process may correspond to a process of the creation of the first cryptographic asset. In an embodiment, one or more private keys of the one or more users, and communicate channels may input to the AES, and the output of the AES may be encrypted information associated with the one or more private keys of the token holders and communicate channels. In another embodiment, the system 102 may be further configured to implement Ron Rivest, Adi Shamir and Leonard Adleman (RSA) technique for public-key encryption. The public key encryption may be useful for authentication and digital signatures. For example, RSA can be used to create digital signatures that can verify the authenticity of documents or transactions related to the first cryptographic asset 116. Details about the generation of the first cryptographic asset 116 are provided below.

At 404, a set of hashing techniques may be implemented on the generated first 3D digital object. In an embodiment, the system 102 may be configured to implement the set of hashing algorithms on the generated first 3D digital object and/or the encrypted 3D model. Examples of the set of hashing algorithms may include, but are not limited to, a secure hash algorithm (SHA)-256, SHA-3, a BLAKE2 algorithm, a skein algorithm, or a whirlpool algorithm. The system 102 may be configured to generate unique identifiers for the first 3D digital object based on the application of at least one of the set of hashing algorithms. The generated unique identifiers may be stored on the selected first blockchain network 106 and used to verify the authenticity and ownership of the first 3D digital object.

At 406, a first cryptographic asset associated with the first physical object may be generated. In an embodiment, the system 102 may be configured to generate the first cryptographic asset 116 associated with the first physical object based on the encrypted 3D model and generated unique identifiers that may be digitally signed. In an embodiment, asset metadata associated with the first cryptographic asset may be stored in the memory 204. The system 102 may be configured to use the asset metadata for trading of the first cryptographic asset 116.

In an embodiment, the system 102 may be further configured to use Zero-Knowledge Proofs for Confidentiality. Zero-knowledge proofs may be used to ensure confidentiality and privacy of sensitive information related to the first cryptographic asset 116. For example, zero-knowledge proofs can be used to verify that an investor may have sufficient funds to invest in the first cryptographic asset 116 without revealing the actual amount of funds they have.

In another embodiment, the system 102 may be configured to use multi-party computation techniques. The multi-party computation techniques may be used to securely process and analyze large amounts of data related to the first cryptographic asset 116. This may be useful for tasks such as risk analysis or asset valuation. The multi-party computation technique may allow multiple parties to securely compute a function or algorithm without revealing their inputs to each other.

In another embodiment, the system 102 may be further configured to apply Homomorphic encryption technique. The Homomorphic encryption technique may be used to securely process and analyze data related to the first cryptographic asset 116 without compromising privacy or security. Homomorphic encryption allows computations to be performed on encrypted data without first decrypting it, which can be useful for securely processing sensitive data.

At 408, the generated first cryptographic asset 116 may be rendered on a marketplace for trading. In an embodiment, the first cryptographic asset 116 may be rendered based on the implementation of the set of hashing techniques and the encryption of the first 3D digital object. In an embodiment, a first user input may be received. The first user input may be associated with a selection of a first blockchain network from a set of blockchain networks. In an embodiment, the system 102 may be configured to render the set of blockchain networks on the first user device 108 associated with the first user 112. The first user 112 may provide the first user input via the first user device 108. In an embodiment, the first user 112 may select the first blockchain network from the set of blockchain networks based on a plurality of factors related to, but not limited to, security, scalability, and functionalities. By way of example and not limitation, the system 102 may be configured to select Ethereum® for the first cryptographic asset 116, as it provides a smart contract platform that can automate the transfer and ownership of the corresponding assets.

In an embodiment, the system 102 may be configured to generate the first smart contract to be associated with the generated first cryptographic asset 116. In an embodiment, the system 102 may be configured to set up self-sovereign identifiers for the one or more users. The system 102 may be further configured to generate the first smart contract based on the self-sovereign identifiers and the selected first blockchain network. The first smart contract may be a self-executing program that may automatically execute the transfer and ownership of the first cryptographic asset 116. The first smart contract may be created using specialized software that may define one or more rules and conditions of the first smart contract. The system 102 may be further configured to deploy the first smart contract the selected first blockchain platform.

In an embodiment, the generated first cryptographic asset 116 may be traded in accordance with the generated first smart contract. In an embodiment, the marketplace associated with the first blockchain network. Details about trading of the first cryptographic asset 116 are provided, for example, in FIG. 5.

Therefore, the disclosed invention may provide a hybrid approach that may combine advanced cryptographic techniques such as AES for symmetric-key encryption, RSA for public-key encryption, and SHA-2 or SHA-3 for hashing, along with zero-knowledge proofs, multi-party computation, and homomorphic encryption, to create a highly secure and tamper-proof system for tokenizing assets that may ensure the authenticity and ownership of the assets while also ensuring confidentiality and privacy of sensitive information related to the assets.

In an embodiment, the system 102 may be further configured to create one or more tokens from the generated first cryptographic asset 116. Each token may be a digital representation of the first cryptographic asset 116 that may be bought, sold, and traded on the marketplace. In an embodiment, the one or more tokens of the first cryptographic asset 116 may be created using specialized software that may define the properties and characteristics of each token, such as the total supply, price, and ownership. In an embodiment, the system 102 may also provide a subscription model where the one or more users may be able to subscribe to the set of 3D digital objects listed on the marketplace. For example, a monthly subscription amount may be paid by the user which rotates all minted NFTs. These NFT assets could then be displayed via a proprietary product of the owner of the NFT. In this embodiment, the subscription may bring real-life NFT artwork from a metaverse into a consumer's living room. In another example, the monthly subscription amount may entitle a customer to get unlimited access to all NFT artwork available on the NFT marketplace for a period of time.

After the creation of one or more tokens, the system 102 may be configured to link each token to a smart contract. Each token may be linked to the smart contract, which may ensure that the transfer and ownership of the tokenized asset are automatically executed according to the rules and conditions of the smart contract.

The system 102 may be further configured to issue tokens to customers or investors who may wish to purchase at least one token of the first cryptographic asset 116. The customers or investors may be able to purchase the tokens using crypto currency or fiat currency, depending on the rules and conditions of the smart contract.

In another embodiment, the system 102 may be configured to trade tokens. The tokens may be bought, sold, and traded on the blockchain platform. This may provide liquidity and flexibility for investors and buyers. The transfer of ownership of the tokenized asset may be automatically executed according to the rules and conditions of the smart contract. Hence, tokenization (or cryptographic asset generation) may involve creating a digital representation of the real-world asset using specialized software and linking it to a smart contract on the blockchain platform. The token can then be issued, traded, and transferred according to the rules and conditions of the smart contract, providing a secure and tamper-proof system for ownership and transfer of the token (or the cryptographic asset asset). In an embodiment, the system 102 may include a hardware wallet that may be used by the one or more users to trade tokens or the first cryptographic asset. Details about buying, selling, and trading of the tokens may be provided, for example, in FIG. 5.

FIG. 5 is a diagram that illustrates exemplary operations for monetization of the first cryptographic asset on a marketplace, in accordance with an embodiment of the disclosure. FIG. 5 is explained in conjunction with elements from FIG. 1, FIG. 2, FIG. 3, and FIG. 4. With reference to FIG. 5, there is shown a block diagram 500 that illustrates exemplary operations from 502 to 510, as described herein. The exemplary operations illustrated in the block diagram 500 may start at 502 and may be performed by any computing system, apparatus, or device, such as by the system 502 of FIG. 1 or processor 202 of FIG. 2. Although illustrated with discrete blocks, the exemplary operations associated with one or more blocks of the block diagram 500 may be divided into additional blocks, combined into fewer blocks, or eliminated, depending on the particular implementation.

At 502, a cryptographic asset rendering operation may be performed. In the cryptographic asset rendering operation, the system 102 may be configured to render the first cryptographic asset 116 on the UI 114 one or more user devices associated with one or more users. The one or more user devices may include the user device 108. The one or more users may correspond to potential customers or investors for the cryptographic asset. In an embodiment, the system 102 may be configured to list the generated first cryptographic asset 116 on an NFT marketplace where potential customers may purchase or trade multiple cryptographic assets. The NFT marketplace may restrict the one or more users from downloading or accessing the first cryptographic asset 116 without the permission of an owner of the physical object or without payment of a pre-defined fee. Further, an ownership right of the first cryptographic asset 116 may be allocated to the owner of the first physical object. In an embodiment, the NFT marketplace may allow the one or more users to mint the first cryptographic asset on the NFT marketplace.

At 504, a user input reception operation may be performed. In the user input reception operation, the system 102 may be configured to receive a first user input from the user device 108. As discussed above, the one or more user devices may include the user device 108. In an embodiment, the first user input may be received from the user device 108 via the first UI element 118. The first user 112 may click on the first UI element 118 to access the first cryptographic asset 116. In an embodiment, after clicking on the first UI element 118, the first user 112 may have to transfer the pre-defined fee to the owner of the first physical asset or the marketplace. The transfer of the pre-defined fee may provide a subscription for the first cryptographic asset 116 to the first user 112 for a pre-defined period of time.

At 506, a cryptographic asset decryption operation may be performed. In the cryptographic asset decryption operation, the system 102 may be configured to decrypt the first cryptographic asset 116. In an embodiment, the system 102 may be configured to decrypt the first cryptographic asset 116 based on the confirmation of the reception of the predefined licensing amount by the owner of the first physical asset or the marketplace. The system 102 may be configured to decrypt the cryptographic asset into the first 3D digital object.

At 508, an access control operation may be executed. In the access control operation, the system 102 may be configured to grant an access to the first cryptographic asset 116 to the first user 112. Specifically, the system 102 may be configured to allow the first user 112 associated with the user device 108 to access the first 3D digital object based on the decryption. In an embodiment, the first user 112 may be allowed to access the first 3D digital object for a pre-defined time period. The predefined time period may depend on terms and conditions of the subscription. In one aspect, the customer may get a license to use the digital object of the physical object.

At 510, an assets recommendation operation may be executed. In the assets recommendation operation, the system 102 may be configured to recommend a set of 3D digital objects to the first user 112. The set of 3D digital objects may be associated with a set of physical objects. In an embodiment, the set of 3D digital objects may be similar to the first physical object. By way of example and not limitation, if the first physical object is a football, then the set of physical objects may include footballs, football shoes, team jerseys, players of football, and the like.

In an embodiment, the system 102 may be configured to receive a first set of comments associated with the first digital object from the one or more users including the user 112. In another embodiment, the system 102 may be configured to receive a first set of reviews associated with the first digital object from the one or more users. The system 102 may be configured to render at least one of the received first set of reviews or the received first set of comments on the user interface of the one or more user devices that may include the user device 108.

FIG. 6 is a flowchart that illustrates an exemplary method for tokenization of real-world physical objects and monetization thereof, in accordance with an embodiment of the disclosure. It will be understood that each block of the flow diagram of the method 600 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 204 of the system 102, employing an embodiment of the present invention and executed by the processor 202. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 600 illustrated by the flowchart diagram of FIG. 6 is used for the tokenization of real-world physical objects. Fewer, more, or different steps may be provided.

At step 602, the method 600 comprises controlling one or more scanning devices 210 to scan the first physical object, and to generate the first geometric mesh of the first physical object based on the scanning of the first physical object. In some embodiments, the system 102 may be configured to control one or more scanning devices 210 to scan the first physical object and to generate the first geometric mesh may be generated by the processor 202. Details of the generation of the first geometric mesh may be provided, for example, in FIG. 3.

At step 604, the method 600 comprises generating a first 3D model of the first physical object. The first geometric mesh of the physical object may be generated based on the generated geometric mesh. In some embodiments, the first 3D model may be generated by the processor 202. Details of the generation of the first geometric mesh may be provided, for example, in FIG. 3.

At step 606, the method 600 comprises determining dimensional data associated with one or more dimensions of the first physical object based on the generated first 3D model. In some embodiments, the dimensional data may be determined by the processor 202. Details about the dimensional data may be provided, for example, in FIG. 3

At step 608, the method 600 comprises controlling the one or more image capture sensors 104 to additional details data for the first physical object. In some embodiments, the one or more image capture sensors 104 may be controlled by the processor 202. Details about the additional details data may be provided, for example, in FIG. 3.

At step 610, the method 600 comprises generating a first three dimensional (3D) digital object based on the generated first 3D model, the dimensional data, and the additional details data. In some embodiments, the first 3D digital object may be generated by the processor 202. Details about the first 3D digital object may be provided, for example, in FIG. 3.

At 612, the method 600 comprises encrypting the generated first 3D digital object to generate a first cryptographic asset 116 associated with the first physical object. In some embodiments, the generated first 3D digital object may be encrypted by the processor 202. Details about the encryption of the first 3D digital object may be provided, for example, in FIG. 4.

At 614, the method 600 comprises outputting the generated first cryptographic asset 116. In some embodiments, the generated first cryptographic asset 116 may be outputted by the processor 202. Details about the outputting of the first 3D digital object may be provided, for example, in FIGS. 4 and 5.

The method 600 may be implemented using a corresponding processor. For example, the method 600 may be implemented by an apparatus or system comprising a processor, a memory, and a network interface of the kind discussed in conjunction with FIG. 2.

In some example embodiments, a computer programmable product may be provided. The computer programmable product may comprise at least one non-transitory computer-readable storage medium having stored thereon computer-executable program code instructions that when executed by a computer, cause the computer to execute the method 600.

In an example embodiment, an apparatus for performing the method 600 of FIG. 6 above may comprise processor (e.g. the processor 202) configured to perform some or each of the operations of the method of FIG. 6 described previously. The processor may, for example, be configured to perform the operations (602-612) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (602-612) may comprise, for example, the processor 202 which may be implemented in the system 102 and/or a device or circuit for executing instructions or executing an algorithm for processing information as described above.

Referring again to FIG. 1, the components described in the network environment 100 may be further broken down into more than one component such as one or more sensors or applications in the system 102 and/or combined together in any suitable arrangement. Further, it is possible that one or more components may be rearranged, changed, added, and/or removed.

In an example embodiment, the system 102 may be embodied in one or more of several ways as per the required implementation. For example, the system 102 may be embodied as a cloud-based service or a cloud-based platform. In each of such embodiments, the system 102 may be communicatively coupled to the components shown in FIG. 1 to carry out the desired operations and wherever required modifications may be possible within the scope of the present disclosure. In an embodiment, the system 102 may also be referred to as a user equipment. In some example embodiments, the system 102 may be any user accessible device such as a mobile phone, a smartphone, a portable computer, and the like. The system 102 may comprise a processor, a memory, and a network interface. The processor, the memory and the network interface may be communicatively coupled to each other. In some example embodiments, the system 102 may comprise a processing means such as a central processing unit (CPU), storage means such as on-board read only memory (ROM) and random access memory (RAM), a display enabled user interface such as a touch screen display, and other components as may be required for specific functionalities of system 102. Additional, different, or fewer components may be provided. For example, the system 102 may be configured to execute and run mobile applications such as a messaging application, a browser application, a navigation application, and the like.

The communication network 110 may be wired, wireless, or any combination of wired and wireless communication networks, such as cellular, Wi-Fi, internet, local area networks, or the like. In one embodiment, the communication network 110 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

Referring again to FIG. 2, the processor 202 may be embodied in a number of different ways. For example, the processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 202 may include one or more processing cores configured to perform independently. A multi-core processor may enable multiprocessing within a single physical package. Additionally, or alternatively, the processor 202 may include one or more processors configured in tandem via the bus to enable independent execution of instructions, pipelining and/or multithreading.

Additionally, or alternatively, the processor 202 may include one or more processors capable of processing large volumes of workloads and operations to provide support for big data analysis. In an example embodiment, the processor 202 may be in communication with the memory 204 via a bus for passing information among components coupled to the system 102.

The memory 204 may be non-transitory and may include, for example, one or more volatile and/or non-volatile memories. In other words, for example, the memory 204 may be an electronic storage device (for example, a computer readable storage medium) comprising gates configured to store data (for example, bits) that may be retrievable by a machine (for example, a computing device like the processor 202). The memory 204 may be configured to store information, data, content, applications, instructions, or the like, for enabling the apparatus to carry out various functions in accordance with an example embodiment of the present invention. For example, the memory 204 may be configured to buffer input data for processing by the processor 202. As exemplarily illustrated in FIG. 2, the memory 204 may be configured to store instructions for execution by the processor 202. As such, whether configured by hardware or software methods, or by a combination thereof, the processor 202 may represent an entity (for example, physically embodied in circuitry) capable of performing operations according to an embodiment of the present invention while configured accordingly. Thus, for example, when the processor 202 is embodied as an ASIC, FPGA or the like, the processor 202 may be specifically configured hardware for conducting the operations described herein. Alternatively, as another example, when the processor 202 is embodied as an executor of software instructions, the instructions may specifically configure the processor 202 to perform the algorithms and/or operations described herein when the instructions are executed. However, in some cases, the processor 202 may be a processor specific device (for example, a mobile terminal or a fixed computing device) configured to employ an embodiment of the present invention by further configuration of the processor 202 by instructions for performing the algorithms and/or operations described herein. The processor 202 may include, among other things, a clock, an arithmetic logic unit (ALU) and logic gates configured to support operation of the processor 202.

The network interface 208 may comprise an input interface and output interface for supporting communications to and from the system 102 or any other component with which the system 102 may communicate. The network interface 208 may be any means such as a device or processor embodied in either hardware or a combination of hardware and software that is configured to receive and/or transmit data to/from a communications device in communication with the system 102. In this regard, the network interface 208 may include, for example, an antenna (or multiple antennae) and supporting hardware and/or software for enabling communications with a wireless communication network. Additionally, or alternatively, the network interface 208 may include the circuitry for interacting with the antenna(s) to cause transmission of signals via the antenna(s) or to handle receipt of signals received via the antenna(s). In some environments, the network interface 208 may alternatively or additionally support wired communication. As such, for example, the network interface 208 may include a communication modem and/or other hardware and/or software for supporting communication via cable, digital subscriber line (DSL), universal serial bus (USB) or other mechanisms. In some embodiments, the network interface 208 may enable communication with a cloud-based network to enable deep learning.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

I claim:

1. A system comprising:

a processor;

a memory communicatively coupled to the processor, wherein the memory stores a plurality of processor-executable instructions which upon execution by the processor cause the processor to:

control one or more laser-based three-dimensional (3D) scanning devices to project at least one laser line onto a surface of a first physical object, capture reflections of the at least one laser line with one or more sensors, and generate a point cloud of the surface of the first physical object based on trigonometric triangulation;

generate a first geometric mesh of the first physical object based on the generated point cloud, wherein the first geometric mesh indicates a 3D structure of the first physical object;

control one or more image capture sensors to capture additional details data for the first physical object, wherein the additional details data for the first physical object includes a first image of the first physical object, and wherein the first image includes surface texture information associated with the first physical object;

superimpose the additional details data on the generated first geometric mesh to generate a first 3D model of the first physical object;

store, in the memory, a digital asset as a named record, the named record comprising the generated first 3D model, dimensional data associated with one or more dimensions of the first physical object, the additional details data, and metadata comprising an identifier associated with the first physical object, wherein physical properties of the first physical object are mapped to the named record for secure tokenization on a blockchain;

encrypt the named record to generate a first cryptographic asset associated with the first physical object; and output the generated first cryptographic asset.

2. The system according to claim 1, wherein the plurality of processor-executable instructions, upon execution by the processor, further cause the processor to:

receive a first user input associated with a selection of a first blockchain network from a set of blockchain networks;

generate a first smart contract to be associated with the generated first cryptographic asset based on the received first user input; and render the generated first cryptographic asset on a marketplace for trading, wherein the generated first cryptographic asset is traded in accordance with the generated first smart contract and the marketplace associated with the first blockchain network.

3. The system according to claim 2, wherein the plurality of processor-executable instructions, upon execution by the processor, further cause the processor to:

encrypt the named record using an encryption technique of a set of encryption techniques;

implement a hashing technique of a set of hashing techniques on the named record;

generate the first cryptographic asset associated with the first physical object based on the implementation of the hashing technique and the encryption of the named record; and render the generated first cryptographic asset on the marketplace for trading.

4. The system according to claim 3, wherein the set of hashing techniques includes a secure hashing algorithm, a BLAKE hashing technique, a skien hashing technique, and a whirlpool hashing technique.

5. The system according to claim 3, wherein the set of encryption techniques includes an advanced encryption standard (AES) technique, a Ron Rivest, Adi Shamir, and Leonard Adleman (RSA) technique, and a Homomorphic encryption.

6. The system according to claim 1, wherein the plurality of processor-executable instructions, upon execution by the processor, further cause the processor to:

render the generated first cryptographic asset on a user interface (UI) of one or more user devices associated with one or more users;

receive a first user input from a first user device of the one or more user devices, wherein the first user input corresponds to a request to access the named record;

decrypt the first cryptographic asset into the named record based on the reception of the first user input; and allow a first user associated with the first user device to access the named record based on the decryption.

7. The system according to claim 6, wherein the plurality of processor-executable instructions, upon execution by the processor, further cause the processor to:

receive a first set of reviews associated with the named record from the one or more user devices;

receive a first set of comments associated with the named record first from the one or more user devices; and render at least one of the received first set of reviews or the received first set of comments on the user interface of the one or more user devices.

8. The system according to claim 7, wherein the processor is further configured to recommend a set of named records associated with a set of physical objects to the first user, wherein the set of named records are related to the named record.

9. A method comprising:

controlling one or more laser-based three-dimensional (3D) scanning devices to project at least one laser line onto a surface of a first physical object, capture reflections of the at least one laser line with one or more sensors, and generate a point cloud of the surface of the first physical object based on trigonometric triangulation;

generating a first geometric mesh of the first physical object based on the generated point cloud, wherein the first geometric mesh indicates a 3D structure of the first physical object;

controlling one or more image capture sensors to capture additional details data for the first physical object, wherein the additional details data for the first physical object includes a first image of the first physical object, and wherein the first image includes surface texture information associated with the first physical object;

superimposing the additional details data on the generated first geometric mesh to generate a first 3D model of the first physical object;

storing, in a memory, a digital asset as a named record, the named record comprising the generated first 3D model, dimensional data associated with one or more dimensions of the first physical object, the additional details data, and metadata comprising an identifier associated with the first physical object, wherein physical properties of the first physical object are mapped to the named record for secure tokenization on a blockchain;

encrypting the named record to generate a first cryptographic asset associated with the first physical object; and outputting the generated first cryptographic asset.

10. The method according to claim 9, further comprising:

receiving a first user input associated with a selection of a first blockchain network from a set of blockchain networks;

generating a first smart contract to be associated with the generated first cryptographic asset based on the received first user input; and rendering the generated first cryptographic asset on a marketplace for trading, wherein the generated first cryptographic asset is traded in accordance with the generated first smart contract and the marketplace associated with the first blockchain network.

11. The method according to claim 10, further comprising:

encrypting the named record using an encryption technique of a set of encryption techniques;

implementing a hashing technique of a set of hashing techniques on the named record;

generating the first cryptographic asset associated with the first physical object based on the implementation of the hashing technique and the encryption of the named record; and rendering the generated first cryptographic asset on the marketplace for trading.

12. The method of claim 11, wherein the set of hashing techniques includes a secure hashing algorithm, a BLAKE hashing technique, a skien hashing technique, and a whirlpool hashing technique.

13. The method of claim 11, wherein the set of encryption techniques includes an advanced encryption standard (AES) technique, a Ron Rivest, Adi Shamir, and Leonard Adleman (RSA) technique, and a Homomorphic encryption.

14. The method of claim 9, further comprising:

rendering the generated first cryptographic asset on a user interface (UI) of one or more user devices associated with one or more users;

receiving a first user input from a first user device of the one or more user devices, wherein the first user input corresponds to a request to access the named record;

decrypting the first cryptographic asset into the named record based on the reception of the first user input; and allowing a first user associated with the first user device to access the named record based on the decryption.

15. The method of claim 9, further comprising:

receiving a first set of reviews associated with the named record from the one or more user devices;

receiving a first set of comments associated with the named record from the one or more user devices; and rendering at least one of the received first set of reviews or the received first set of comments on the user interface of the one or more user devices.

16. A non-transitory computer-readable medium having stored instructions thereon, computer-executable instructions that when executed by a system, causes the system to execute operations, the operations comprising:

controlling one or more laser-based three-dimensional (3D) scanning devices to project at least one laser line onto a surface of a first physical object, capture reflections of the at least one laser line with one or more sensors, and generate a point cloud of the surface of the first physical object based on trigonometric triangulation;

generating a first geometric mesh of the first physical object based on the generated point cloud, wherein the first geometric mesh indicates a 3D structure of the first physical object;

controlling one or more image capture sensors to capture additional details data for the first physical object, wherein the additional details data for the first physical object includes a first image of the first physical object, and wherein the first image includes surface texture information associated with the first physical object;

superimposing the additional details data on the generated first geometric mesh to generate a first 3D model of the first physical object;

storing, in a memory, a digital asset as a named record, the named record comprising the generated first 3D model, dimensional data associated with one or more dimensions of the first physical object, the additional details data, and metadata comprising an identifier associated with the first physical object, wherein physical properties of the first physical object are mapped to the named record for secure tokenization on a blockchain;

encrypting the named record to generate a first cryptographic asset associated with the first physical object; and outputting the generated first cryptographic asset.

* * * * *